United States Patent [19]
Benneweis et al.

[11] Patent Number: 5,996,516
[45] Date of Patent: Dec. 7, 1999

[54] AIR FLOW CONTROL FOR AIR SEEDERS

[75] Inventors: Robert K. Benneweis; Cameron D. Bodie; Francis G. Lang; Russell J. Memory, all of Saskatoon, Canada

[73] Assignee: Flexi Coil Ltd., Saskatoon, Canada

[21] Appl. No.: 09/316,136

[22] Filed: May 21, 1999

Related U.S. Application Data

[60] Provisional application No. 60/086,422, May 22, 1998.

[51] Int. Cl.$^6$ .................................................... A01C 7/20
[52] U.S. Cl. ................................................................ 111/176
[58] Field of Search ..................................... 111/174, 176, 111/900

[56] References Cited

U.S. PATENT DOCUMENTS

| | | | |
|---|---|---|---|
| 3,964,639 | 6/1976 | Norris et al. | 111/176 X |
| 4,296,695 | 10/1981 | Quanbeck | 111/34 |
| 4,473,016 | 9/1984 | Gust | 111/1 |
| 4,503,786 | 3/1985 | Tautfest | 111/86 |
| 4,634,522 | 1/1987 | Edholm et al. | 209/154 |
| 5,161,473 | 11/1992 | Landphair et al. | 111/176 |

OTHER PUBLICATIONS

Harmon Models 3100/1830/1400 Air Seeder Sales Brochure (1998).
Concord Air System 1502 Sales Brochure (1998).
John Deere Air Seeding Systems Sales Brochure (1996).
Bourgault 4000 Series Air Seeder Operator's Manual pp. 2.20 through 2.38 (Undated).
Case/IH Model 2300 Air Seeder Operator's Manual pp. 17A–22A (Dec., 1995).
Morris Model 7000 Air Seeder Operator's Manual pp. 5–29 to 5–34 (Undated).
John Deere Model 1900 Air Seeder Operator's Manual pp. 45–14 through 50–19 (Undated).
Flexi–Coil 50 Series Air Seeder Operator's Manual pp. 3–5, 4–37 and 4–38 (Undated).

*Primary Examiner*—Christopher J. Novosad
*Attorney, Agent, or Firm*—Griffin, Butler, Whisenhunt & Szipl, LLP

[57] ABSTRACT

An air seeder is provided with a control system for controlling the velocity of air flowing though the product delivery tubes between the product storage tanks and the planting mechanism for delivering the product into the ground. A multiple tank air seeder would be provided with a bank of product delivery tubes for each product storage tank with an air damper mechanism incorporated into each respective bank of product delivery tubes. An electric actuator is mounted on the air cart to connect to each respective air damper mechanism and effect the movement thereof between a fully closed and a fully opened position and, thereby restrict the movement of air through the product delivery tubes. The control mechanism includes a control panel from which the electric actuators for the air damper mechanisms and an electric actuator for controlling the rotational speed of the fan creating the flow of air through the product delivery tubes can be controlled. The air velocity is controlled by setting a base fan speed through the control panel and then sequentially setting the rotational position of each respective air damper mechanism so that each bank of product delivery tubes can have a different resulting air velocity for proper delivery of the product, e.g. seed or fertilizer, through the respective product delivery tubes.

19 Claims, 10 Drawing Sheets

AIR FLOW CONTROL FOR AIR SEEDERS

CROSS-REFERENCE TO RELATED APPLICATIONS

This application claims domestic priority on U.S. Provisional Patent Application Ser. No. 60/086,422, filed May 22, 1998.

BACKGROUND OF THE INVENTION

This invention pertains generally to air cart units, also referred to as air seeders, and more specifically to controlling air flow settings for seeding units consisting of one or multiple storage hoppers.

Agricultural practices are becoming more demanding as the requirements for increased yield and better quality crop output are growing. Satisfying these demands is important for a farm operation to remain competitive. One measure that aids in meeting these demands is providing equipment that allows for accurate seed placement during planting in a quick and efficient manner. The design of planting units is continuously being changed in an attempt to improve their performance.

Planting units have long since been equipped with methods of improving the accuracy and control by which seeds are placed in furrows. Planting units commonly use air flow to transport seed from a storage hopper to the seed boot and into the ground. Such prior art are disclosed in U.S. Pat No. 4,296,695 issued to Quanbeck, U.S. Pat. No. 4,473,016 issued to Gust, U.S. Pat. No. 4,503,786 issued to Tautfest and U.S. Pat. No. 5,161,473 Landphair.

Pneumatic systems are also used to transport materials through tubes in applications not limited to agriculture. An arrangement for a machine is disclosed in U.S. Pat. No. 4,634,522 issued to Edholm. In this invention, particles are entrained in an air flow and carried through the system for the purpose of separating larger particles from smaller particles. The invention also discloses a throttling device as means to control the air flow.

In the prior art of pneumatic air carts, a number of disadvantages exist. Earlier designs consisted of several moving parts. This resulted in equipment that was complex and difficult to maintain. Also, these designs were costly to manufacture and operate. Another drawback of prior art is the lack of adaptability in controlling the air flow and seed delivery rate. Correct air flow settings and fan speed are important to ensure proper placement of seeds in furrows. Utilizing the minimum amount of air reduces seed bounce and reduces seed damage that can occur from high velocity impact. Adequate air flow settings also ensure that air distribution lines remain free of debris which can obstruct the seed flow and ensure that they do not become clogged during seed transport from the metering boxes to the seed boot. Using only the minimum required air flow settings also uses minimal power, lowering the overall power required to operate the distribution system. Another benefit of correct air flow settings is that when the air system is shut down, the primary run hoses will quickly and evenly empty out.

U.S. Pat. No. 5,161,473 discloses a pneumatic air seeder that controls the seed delivery rate by adjusting the angle of and size of the seed delivery tube. This adjustment of the seed tube is difficult and cumbersome to perform.

Ensuring correct air flow settings has been a common problem in air carts with multiple tanks. When different products are traveling in separate air flow tubes or runs, the amount of air necessary to move each product is different.

The 4000 series air seeder manufactured by Bourgault is designed to accommodate up to triple shoot applications. In this case, the air seeder is equipped with two fans. The design is such that one fan controls the air flow settings in one run and the second fan controls the air flow settings for the remaining two runs. Knife valves are used to open or close off runs. The airflow is predominately controlled by the fan settings of individual runs.

The majority of air seeders are equipped with a single fan used to generate the air flow. In these cases, when double or triple shoot applications are employed, controlling the air flow in each individual set of runs has proven to be a problem.

Case IH introduced their 2300 air system that was designed to handle double shoot applications. The air volume in each run is controlled by baffles that are situated in either side of the blower on the air seeder. Each baffle is positioned by a bolt. The operator can adjust the baffle position to control whether more or less air travels in the run by either tightening or loosening each bolt. This system, while allowing for varying air flow volume settings, does not have any means to indicate the baffle position, and thus no means to indicate the resulting air flow settings. The process becomes a guessing game of how much or little to adjust each bolt.

Other air seeder designs also incorporate damping mechanisms of various natures to control the amount of air carried through each tube. New Noble utilizes a damping mechanism on their 92 series air seeders, Harmon uses an air damper as standard equipment on all air seeders and European manufacturer Rabe Werk also has incorporated a damping lever on their air seeders.

The 7000 series air seeder manufactured by Morris is designed to accommodate double shoot applications. When the air seeder is configured for double shoot, a plenum damper is used to control the air flow settings in each run. Each plenum damper can be set to the fully open, three quarters, one half, one quarter or fully closed position. An indicator panel is situated by each damper to inform the operator where to position the damper for any of these settings. Again, the damping mechanism is manually adjusted by the operator.

The John Deere 1900 air seeder uses a damper mechanism to control the air flow volume for single and double shoot applications. The damper is hand positioned by use of a crank. The position of the damper is determined by a color coded position indicator rod. This method is acceptable for single shoot applications (when the damper is positioned to completely shut off one run) or in double shoot applications when equal amounts of air flow are necessary (and the damper is positioned in the center). But, even in these cases when the damper is fairly easy to position, the process is again cumbersome and inefficient.

In double shoot applications, it is uncommon that both products will require equal amounts of air. Quite often, the required air flows are different for each product. Using the John Deere 1900 air seeder damper design, the operator will have difficulty determining how to position the hand crank in order to achieve the desired air flow volumes for each run. This necessitates trial and error to determine the damper position that results in the correct air flows.

Currently, the damping mechanism designed by these farm equipment manufacturers are all fully manual. The position of the damper is controlled by a hand crank or lever. If the air flow needs to be adjusted during planting, the operator is required to cease planting and adjust the hand crank. This results in inefficient use of precious seeding time.

The 50 series air seeder manufactured by Flexi-Coil is a three tank air seeder. It is designed such that each of the three runs has an air damper located at each metering box in the primary lines. The dampers are also positioned using a lever that is manually positioned by the operator. The lever is situated on the body of the cart. This method has proven to be time consuming and cumbersome. Also, adjusting the air flow has proven to be difficult since the air flow in each tube is dependent upon one another. Adjusting the air dampers to achieve the optimum air velocity and volume depending upon the products being planted has been a tedious process of trial and error. Also, controlling and changing the fan RPM has been difficult to do. None of the above operations can be performed 'on the go'. The operator has to cease planting and manually change the required airflow settings.

All these drawbacks of the prior art can lead to unnecessary complexity. In light of the growing size of farm equipment, including planting units which consist of three or more storage tanks, a great deal of time and money can be lost simply on the maintenance of such seed distribution designs. Improved maintenance would result in ease of operation, time saving benefits and cost saving benefits.

It would be desirable then, to provide a means of remote monitoring and controlling of fan speed and air damper settings to achieve optimum particle velocity in the air distribution lines of an air cart. It would also be desirable to provide an improved system that allows for fan speed and air damper setting adjustments while the planting unit is in operation.

SUMMARY OF THE INVENTION

In accordance with the aforementioned statements, an objective of the disclosed invention is to control and maintain sufficient airflow speeds to carry products without blockage but minimize bounce and impact damage in order to minimize the power requirement of the air planter.

Another objective is to provide a system that allows for remote monitoring and controlling of fan speed and air damper settings.

Still another objective is to provide a system that allows for adjustments in fan speed and air damper settings on the go.

It is also an objective to provide a system that is flexible and unique for every farming application. The desired goal is to present a time saving, efficient option to controlling the air flow settings that are so vital in achieving the best possible crop output.

The invention involves an air flow control system that allows an operator to control air speed in the distribution system by adjusting fan speed and air flow dampers remotely. The fan speed and the damper settings are controlled by electronic and hydraulic means. The air flow and damper settings are adjusted and monitored by the operator via a console unit with a display panel. This eliminates the presence of manual adjustment levers to position the air dampers as used on prior art.

The disclosed invention is an airflow monitoring and controlling system that is operated from the console in the tractor cab. The control system is used in conjunction with a remote console unit that eliminates the need for the operator to exit the tractor cab to manually adjust the fan speed and damper positions in order to achieve the desired air velocity.

Another feature of the invention is that the dampers are adjusted and controlled independently thus eliminating the trial and error in trying to achieve the optimum air velocity that has existed in prior art. Also, the invention can be used on mechanical drive air carts and variable drive air carts.

Also, since the invention allows for precise air flow settings, the fan speed is minimized and the amount of oil being supplied to the fan is controlled. Thus, the system aids in conserving the overall energy required for operating the air cart.

The invention involves an air seeding unit equipped with a fan to generate air flow and a series of air dampers used to control air speed and volume. Ideally the invention is used for air carts with three storage tanks, but can easily be modified to accommodate more or less than three storage tanks. The invention features an electronic control system which allows the operator to remotely control the fan speed and air damper position settings and to remotely monitor the settings and includes an error/alarm signal to inform the operator of any malfunctions in the system. An electric actuator and a hydraulic valve circuit controls the fan speed and an electric actuator air valve.

These and other objects, features and advantages can be accomplished according to the instant invention by providing an air seeder with a control system for controlling the velocity of air flowing though the product delivery tubes between the product storage tanks and the planting mechanism for delivering the product into the ground. A multiple tank air seeder would be provided with a bank of product delivery tubes for each product storage tank with an air damper mechanism incorporated into each respective bank of product delivery tubes. An electric actuator is mounted on the air cart to connect to each respective air damper mechanism and effect the movement thereof between a fully closed and a fully opened position and, thereby restrict the movement of air through the product delivery tubes. The control mechanism includes a control panel from which the electric actuators for the air damper mechanisms and an electric actuator for controlling the rotational speed of the fan creating the flow of air through the product delivery tubes can be controlled. The air velocity is controlled by inputting a base fan speed through the control panel and then sequentially setting the rotational position of each respective air damper mechanism so that each bank of product delivery tubes can have a different resulting air velocity for proper delivery of the product, e.g. seed or fertilizer, through the respective product delivery tubes.

DETAILED DESCRIPTION OF THE INVENTION

Figures 1, 2:
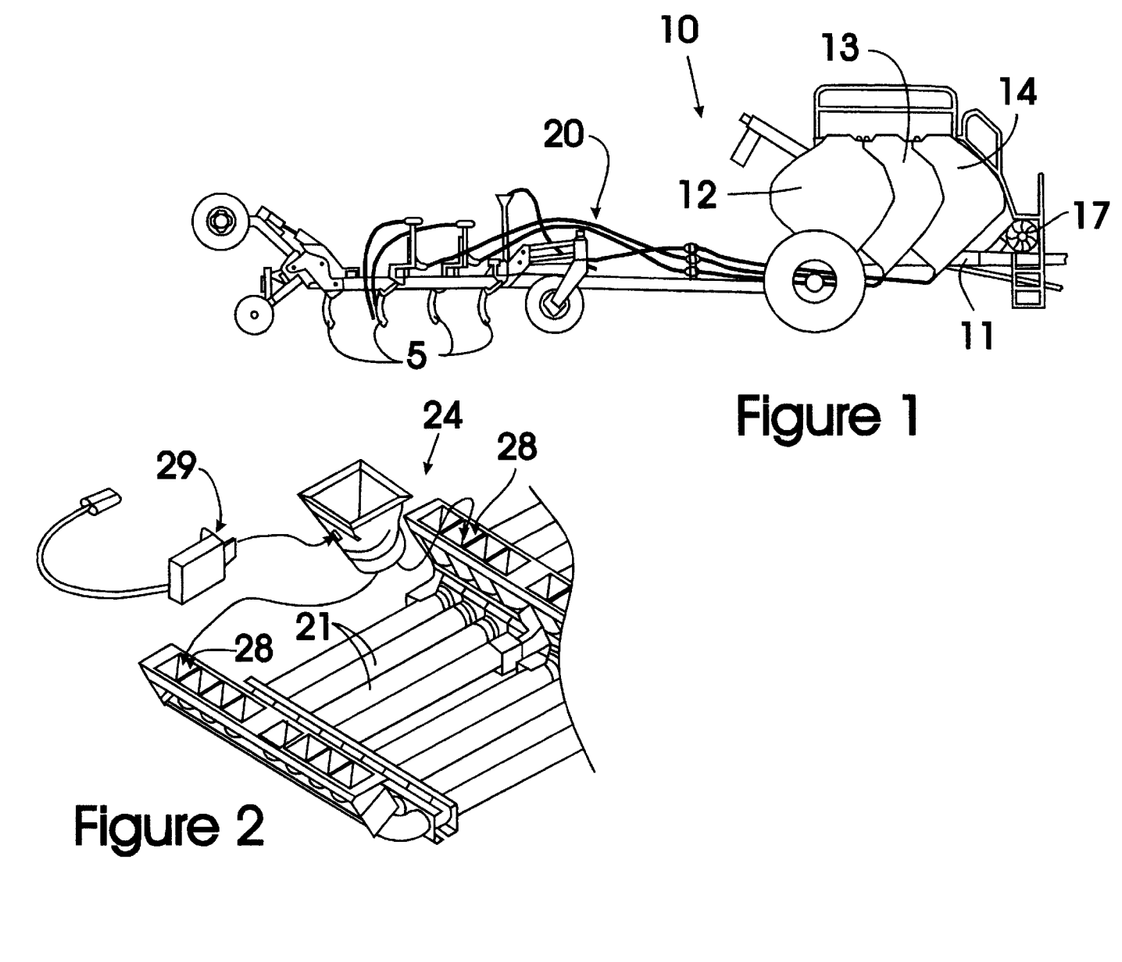
FIG. 1 is a side elevational view of an air cart, commonly referred as an air seeder incorporating the principals of the instant invention.
FIG. 2 is a partial perspective view of a portion of the air cart shown in FIG. 1 to show the location of velocity sensors.
Figure 3:
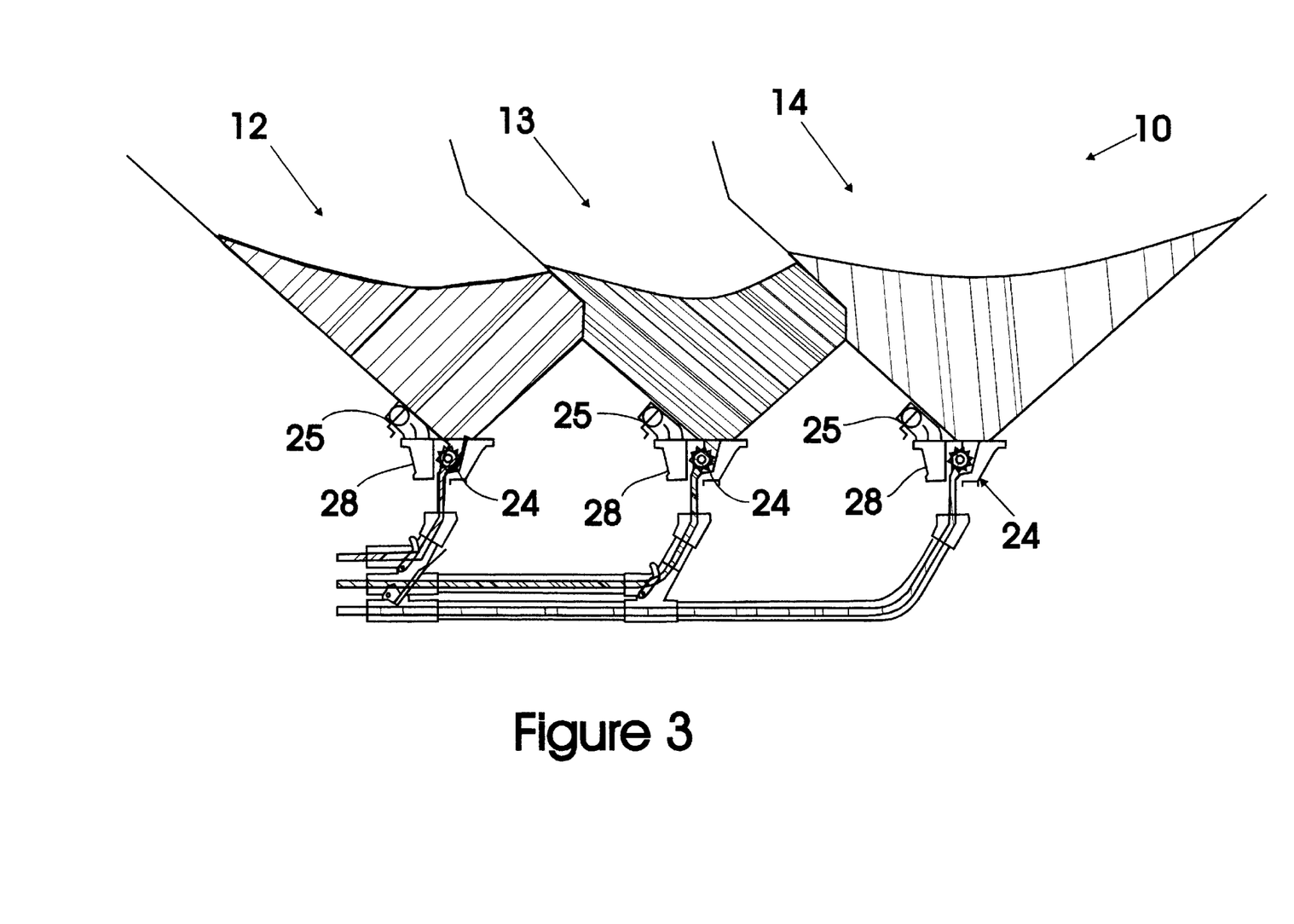
FIG. 3 is a schematic cross-sectional view of the air cart of FIG. 1 through the tanks to show the location of the air dampers.

Referring first to FIGS. 1–3, an air cart unit 10 incorporating the principles of the instant invention can best be seen. Conventional air cart units 10 consists of at least one storage tank 12–14, a metering mechanism 24, hydraulic fan 17, air cart electric harness, air distribution system 20, and earth working planting tools 5. The air distribution system 20 is comprised of a multiple of tubes 21 extending from the storage tanks 12–14 to the planting tools 5. The air distribution system 20 can be configured to a single, double or triple shoot. Air generated by the fan travels through the tubes 21. Seed and/or fertilizer is metered into the tubes 21 through metering ports and is carried to the planting tools 5 by the flow of air through the tubes 21.

In the preferred embodiment, the air cart 10 is provided with three discrete storage tanks, a first storage tank 12, a second storage tank 13 and a third storage tank 14. The air distribution system 20 consists of a series of air flow tubes 21 arranged in respective banks extending from each tank 12–14, and a fan 17 preferably driven in rotation by a hydraulic motor (not shown) arranged to create an air flow through the air flow tubes 21. An air cart electric harness (not shown) provides electrical control for a metering mechanism corresponding to each of the storage tanks, a first metering mechanism 24 for the first storage tank 12, a second metering mechanism 24 for the second storage tank 13, and a third metering mechanism 24 for the third storage tank 14. The tubes 21 are associated with a plurality of planting tools 5 to deliver the metered material from the respective storage tanks 12–14 by the flow of air for planting in the ground. The air cart 10 is provided with velocity sensors 29 located in a meter port 28 on each bank of tubes. One skilled in the art will readily recognize that the instant invention can easily be modified to work in conjunction with an air cart of any configuration.

Figure 4:
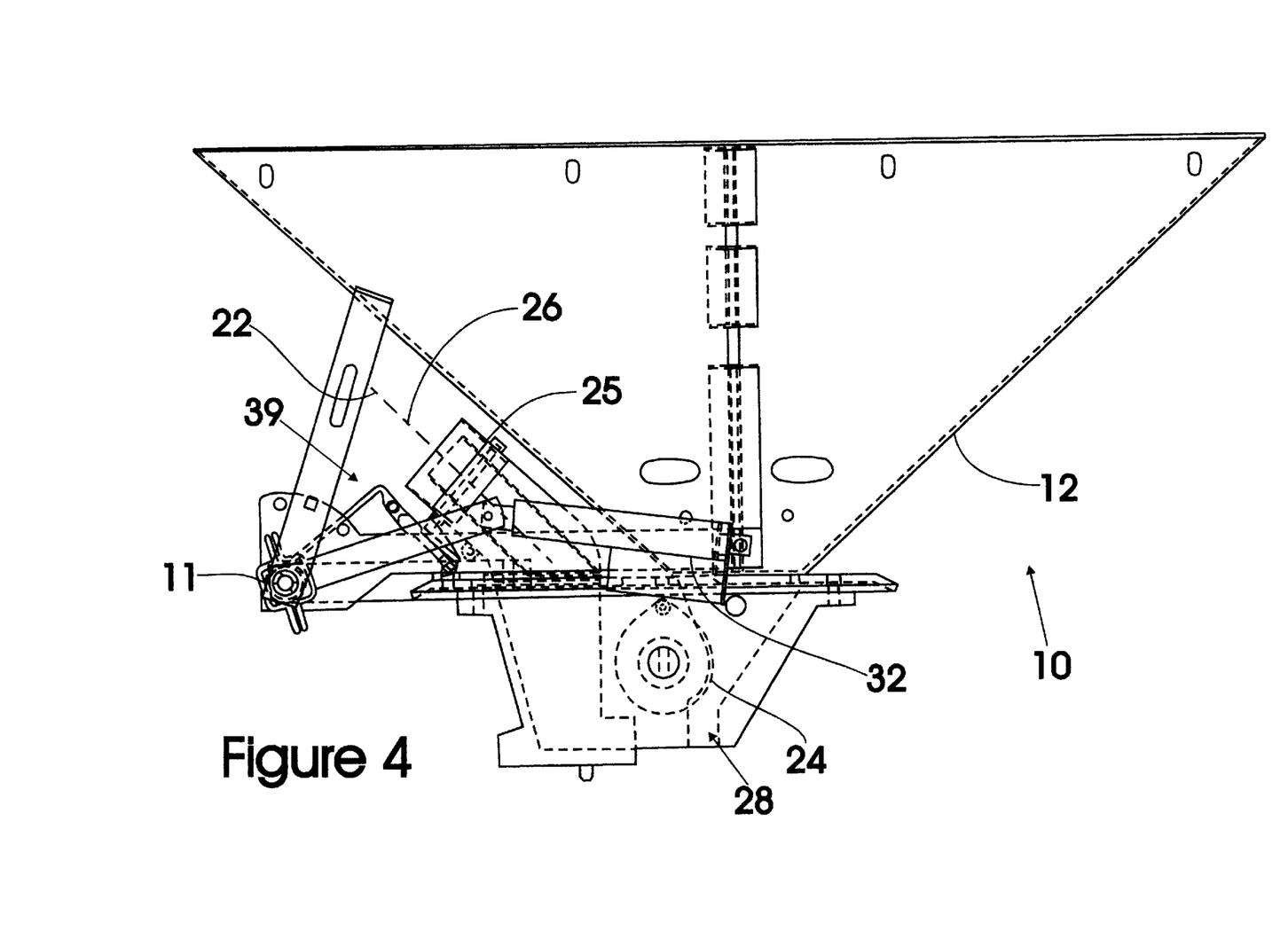
FIG. 4 is an enlarged cross-sectional view of a portion of the tank and metering roll as shown in FIG. 3 to depict an air damper in the closed position.
Figure 5:
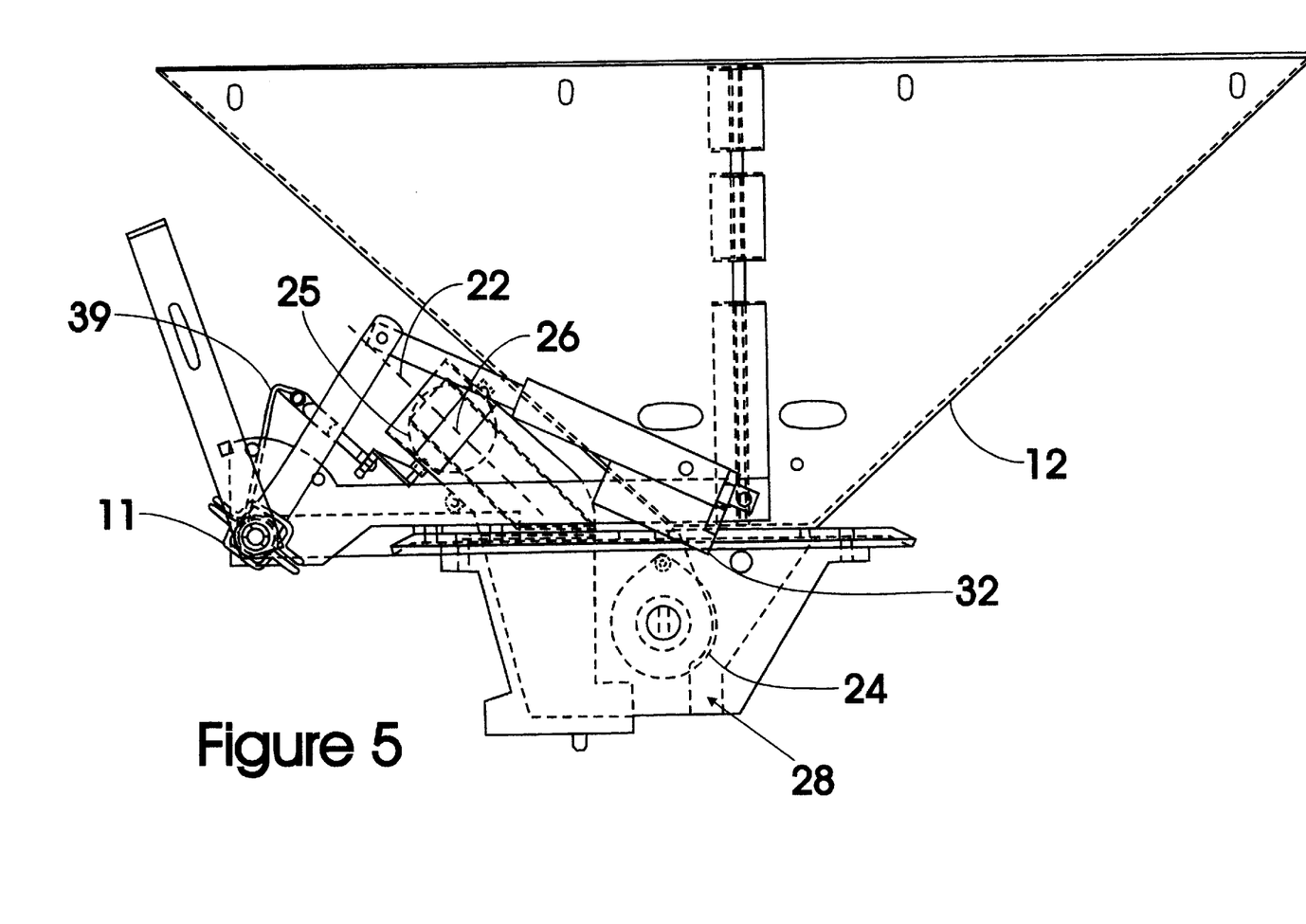
FIG. 5 is a view similar to FIG. 4, but with the air damper in the open position.

Each bank of tubes coming from the respective storage tanks is provided with an air damper 25. Each air damper 25 is comprised of a disk that conforms with the size and shape of the corresponding air flow tube 21. The disk is arranged to be generally concentric with the corresponding air flow tube 21. When the disk is positioned such that the disk axis 26 is in alignment with the air flow tube axis 22, as seen in FIG. 4, the air damper 25 is in the fully closed position. When the disk is positioned such that the disk axis 26 is generally transverse to the air flow tube axis 22, as seen in FIG. 5, the air damper 25 is in the fully open position. The passage of air through the air flow tubes 21 can be restricted to any degree by rotating the air damper disk to a selected position between the fully open and fully closed positions.

Figure 6:
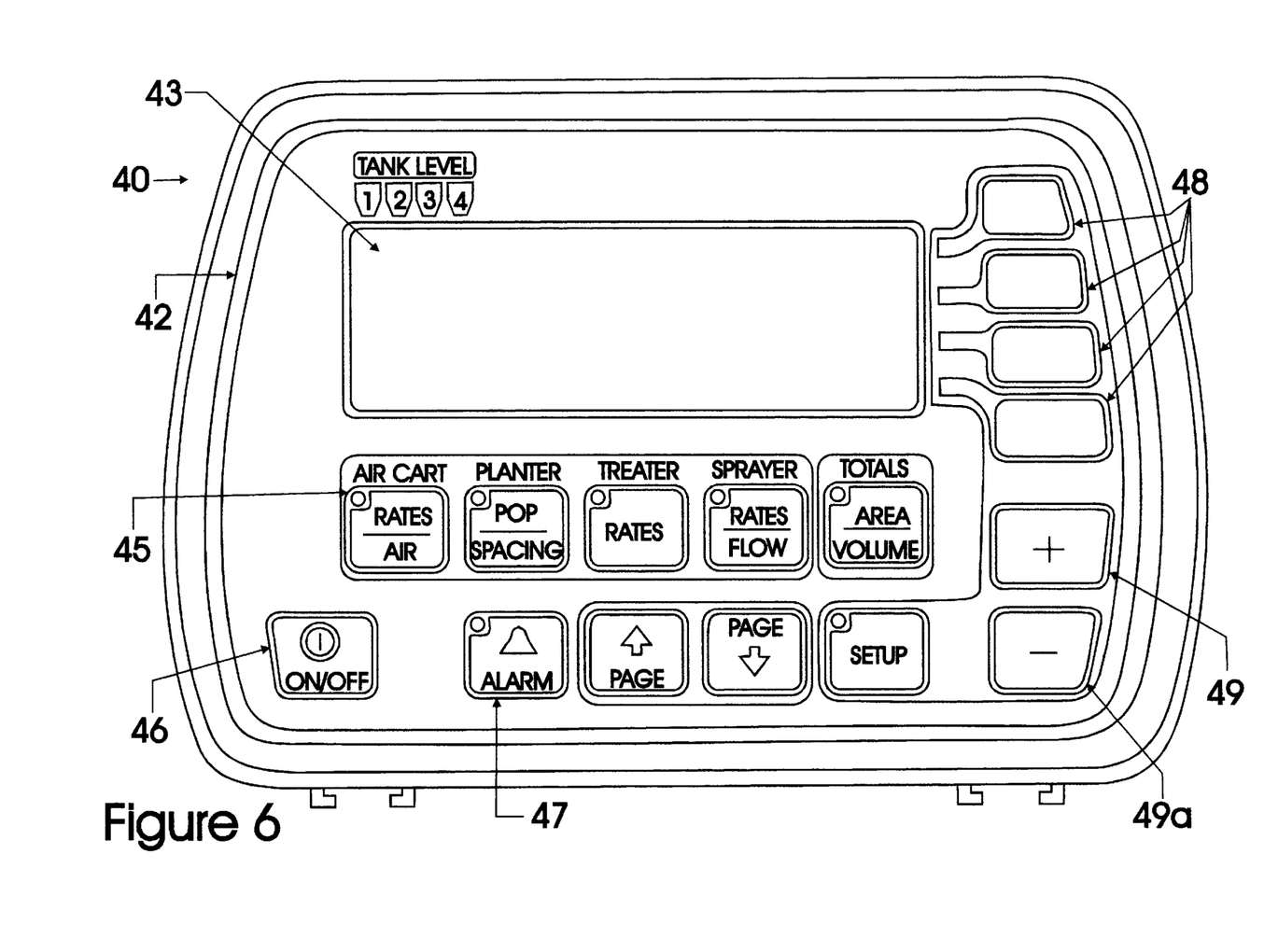
FIG. 6 is a front elevational view of the console and display panel for the air flow control system, the console and display panel being located at a remote location in the prime mover.

The apparatus for controlling the flow of air in the air cart unit 10 includes a console 40, typically placed in the cab of the prime mover, such as a tractor (not shown), to which the air cart unit 10 is conventionally coupled to provide operative and motive power to the air cart unit 10. The console 40 and display panel 42, from where fan speed and damper settings are controlled, is depicted in FIG. 6. The console 40 has a keypad 45 for data entry and scrolling. Included on the keypad are the on/off key 46, the alarm key 47, and various selection keys 48. The increase 49 and decrease 49a keys are used in setting the values for fan speed and air flow speed. A display screen 43 is also on the console 40 to provide a means of output data to the operator.

The control commands are entered via the keypad 45 by the operator. The operator sets the desired fan speed using the increase and decrease keys on the console and display panel. The air dampers in each air flow tube 21 are also set by using the increase and decrease keys on the control and display panel. A velocity number is determined by a method outlined below with respect to setting the fan speed and is dependent upon the types of seed being planted, and whether a single, double or triple shoot configuration is being used. The velocity is adjusted using the increase and decrease keys on the control and display panel. The manipulations of the increase or decrease keys effects adjustment of the position of the linear actuator, which in turn will adjust the air damper accordingly and demonstrate the resultant velocity change on the display panel.

Figure 7:
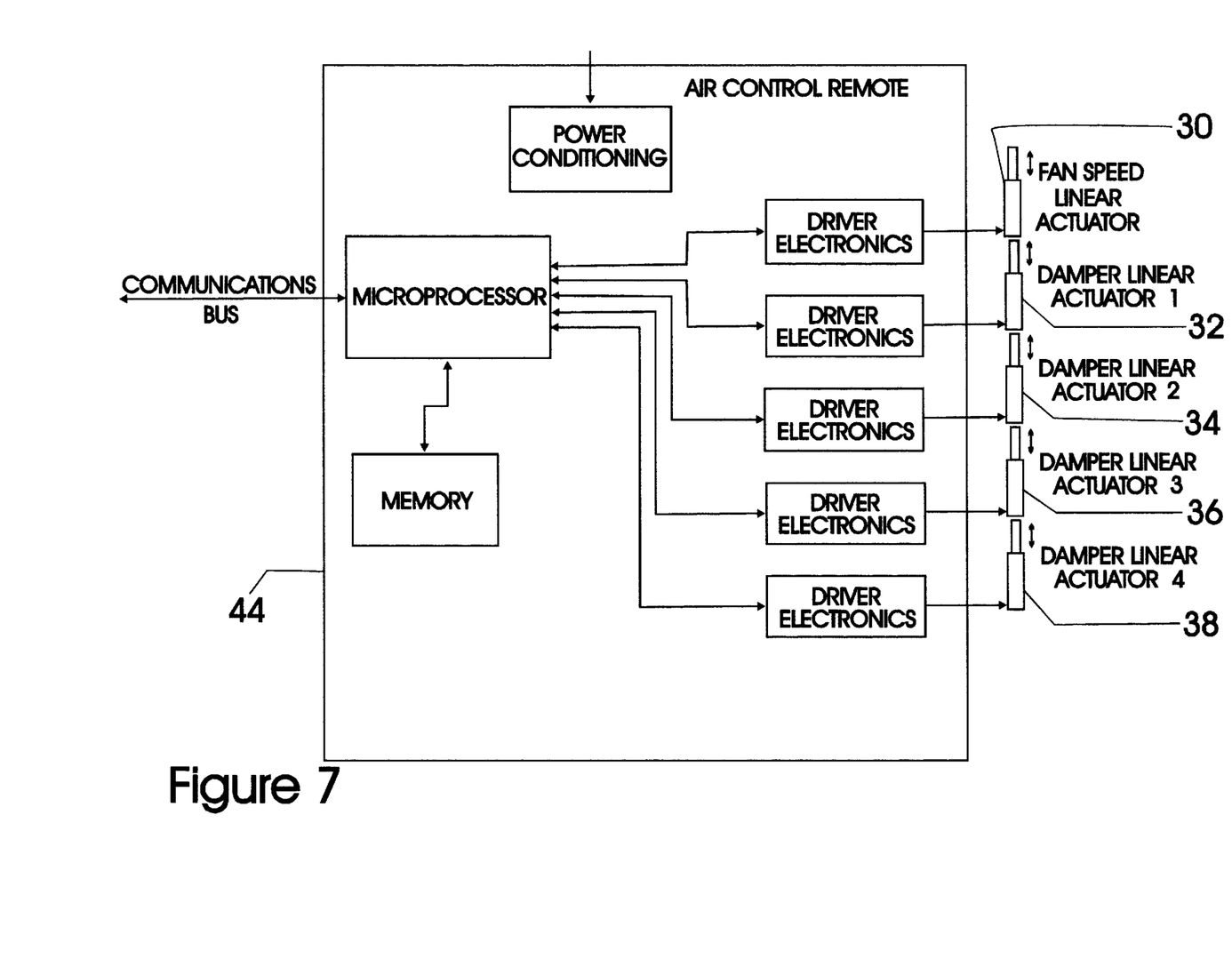
FIG. 7 is a schematic block diagram of the air flow control electronics system.

The input commands are then transmitted from the console unit 40 to the remote electronic circuitry 44, schematically represented by the air flow control remote block diagram of FIG. 7, by a conventional communications bus. The electronic circuitry 44 is located within the remote unit. The circuitry 44 consists of a microprocessor, memory unit and driver electronics. One driver electronics is required for each linear actuator 30–38, preferably in the form of an electric actuator. The preferred embodiment for the control system is for use on air carts with three air dampers and one fan, thus requiring four electric linear actuators 30–36; however, as shown on the block diagram of FIG. 7, an alternative embodiment could incorporate a fifth linear actuator 38, and thus a fifth driver electronics, for the control of another air damper, within the scope of the invention. Accordingly, the air flow control diagram of FIG. 7 depicts one fan speed linear actuator 30, three air damper linear actuators 32–36 and an extra optional air damper linear actuator 38.

The microprocessor is configured to receive data inputted from the console 40 and use this data to control the driver electronics. The driver electronics used in the air control system are such that they experience low power loss. The memory serves as a means for program storage and data storage. As individual components, the microprocessor, memory unit and driver electronics are all standard electronics as known in the art. The electronic circuitry is shown in the provisional application, U.S. Ser. No. 60/086,422, upon which this application claims priority, the depiction of these electrical schematics being incorporated herein by reference.

Figure 9:
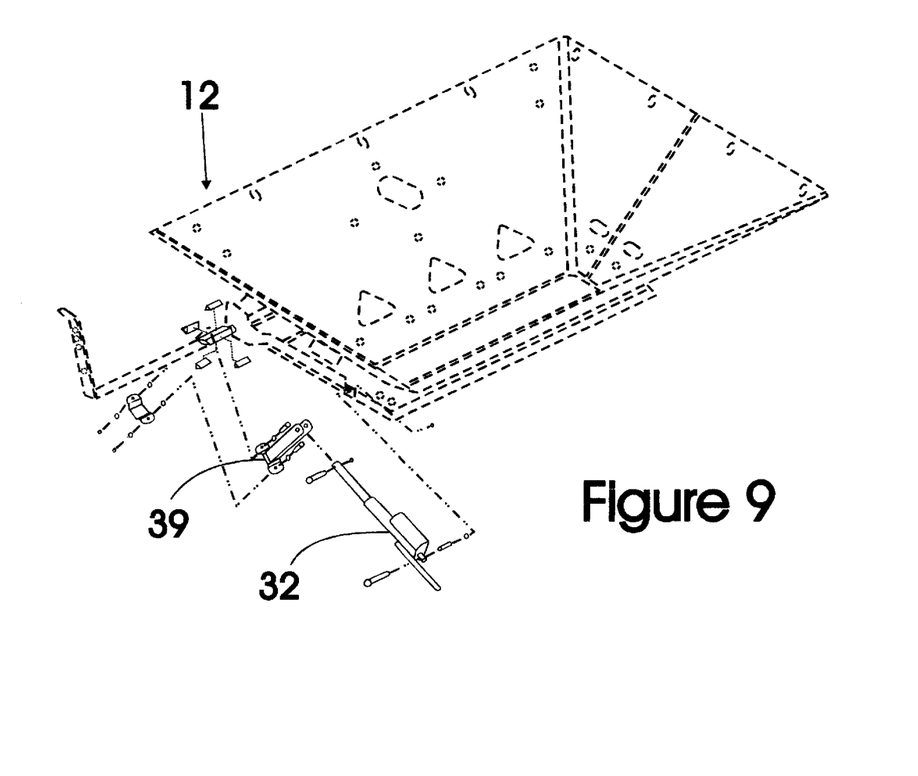
FIG. 9 is an exploded view showing one linear actuator on a tank for controlling the air damper position.

Each storage tank on the air cart is outfitted with one air damper linear actuator used in positioning the air damper on that particular storage tank. As best seen in FIG. 9, an air damper linear actuator 32 is bolted to a storage tank 12. The rod end of the linear actuator is bolted to a linear actuator control arm 39. The control arm 39 is then pivotally mounted at a connection joint on the air cart frame 11 and is also attached to the air damper 25. The other air damper linear actuators are mounted in a similar manner. Each of these air damper linear actuators is also connected to the air cart electric harness (not shown) by an independent extension harness (not shown).

Figure 8:
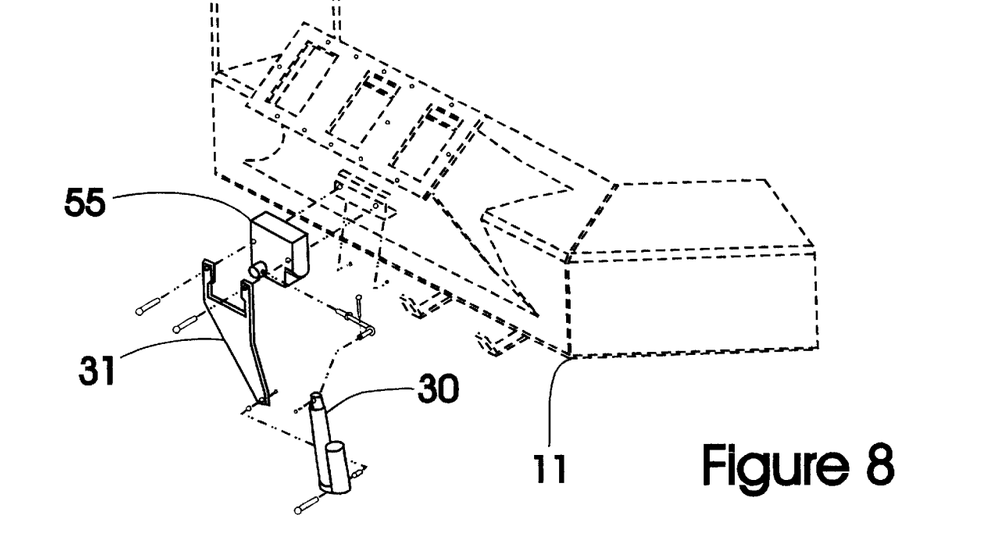
FIG. 8 is an exploded view of the hydraulic flow control valve and fan speed linear actuator on the air cart frame.

The fan speed linear actuator 30 is mounted to the hydraulic flow control valve 35, while the flow control valve is mounted to the air cart frame 11 with a mount plate 31, as best illustrated in FIG. 8. The fan speed linear actuator is also connected to a flow control actuator arm 30. An extension harness (not shown) is used to connect the fan speed linear actuator 30 to the air cart electric harness (not shown).

Figure 10:
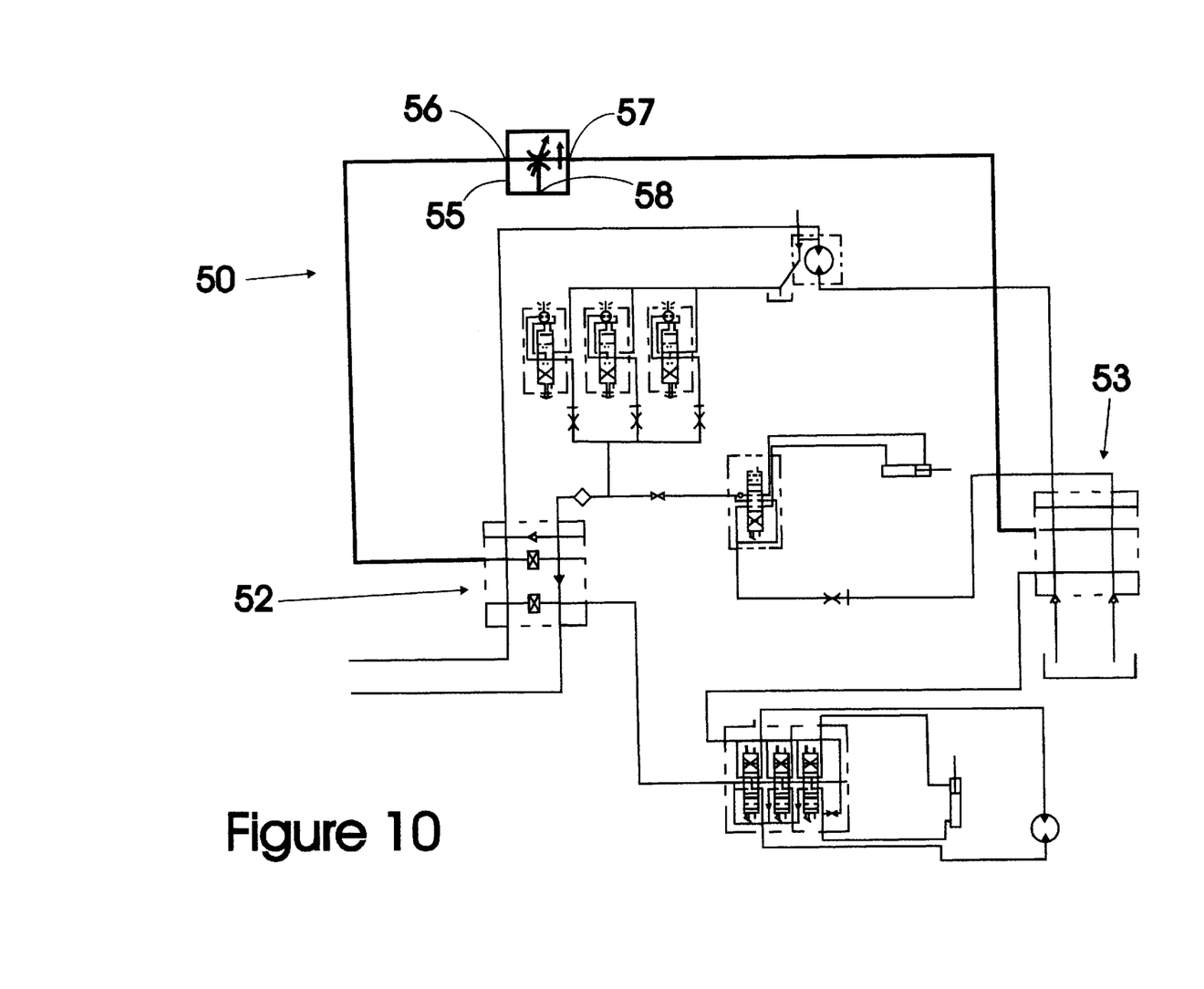
FIG. 10 is a hydraulic schematic diagram of the preferred embodiment of the air flow control on a variable drive air cart.
Figure 11:
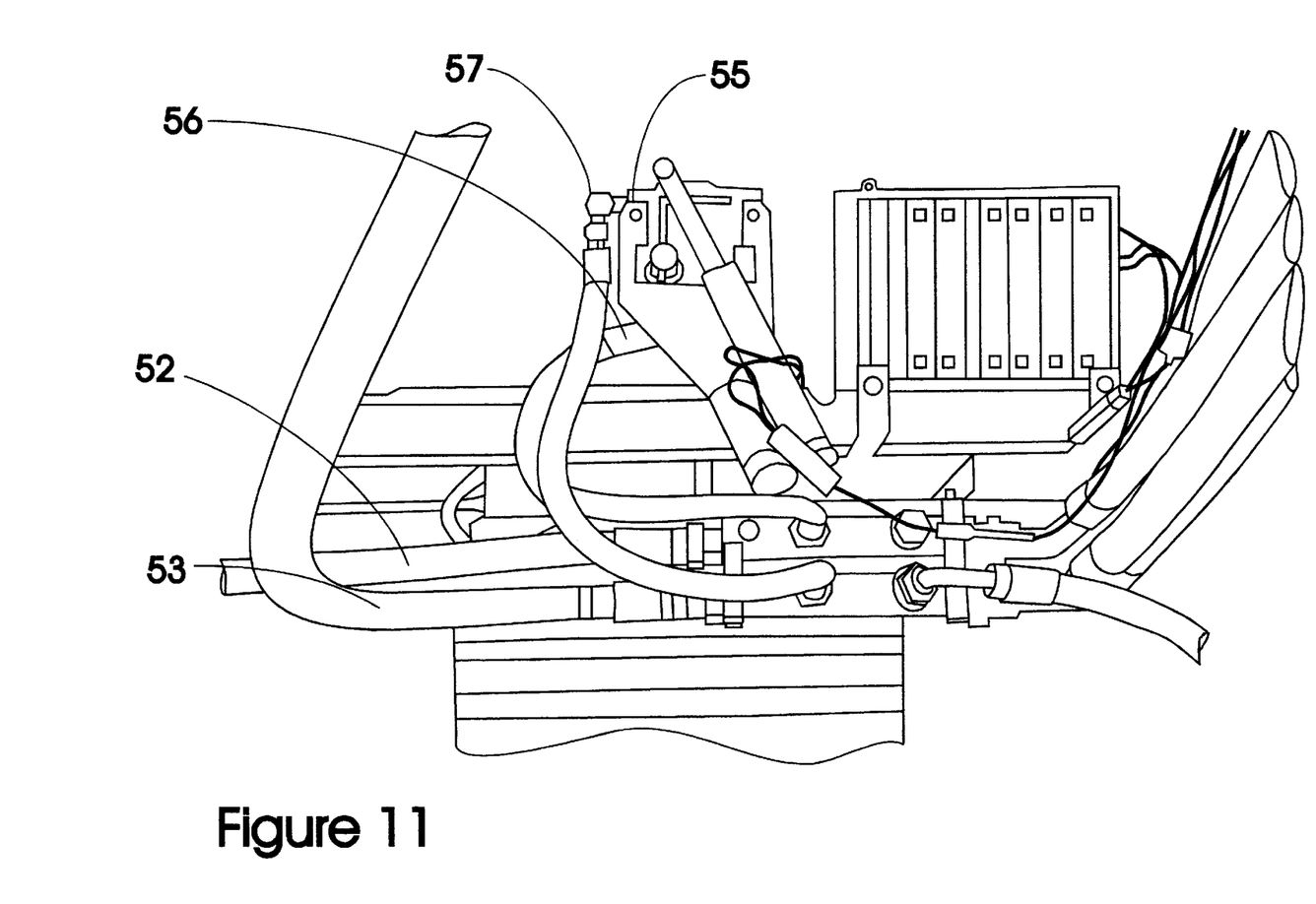
FIG. 11 is a photograph showing the assembly of the electric actuator mounted on the hydraulic flow control valve.

The hydraulic circuit 50 seen in FIG. 10 is the preferred embodiment for a variable drive air cart. The hydraulic flow control valve 55 is shown to have an "IN" port 56, a "CF" port 57 and a "EX" port 58. The hydraulic fluid enters the hydraulic flow control valve 55 via the pressure manifold 52 through the "IN" port 56. The control flow exits via the return manifold 53 through the "CF" port 57 and the "EX" 58 or excess flow port is fitted with a plug. The fan speed as entered by the operator through the console and display panel 42 positions the fan speed linear actuator 30 which sets the hydraulic flow control valve 35 and, thereby, sets the fan speed.

Once the system has positioned the air dampers 25, velocity sensors 29 read the air flow rate and output the data on the display screen 43. The velocity sensors, as known in the art, are located in the meter ports 28 on each bank of tubes on the air seeder 10.

If the output data is not the desired value, then the operator simply adjusts the value (either the velocity number or the fan speed) using the increase and decrease keys on the console unit.

The air control system is also equipped with an error/alarm signal. The alarm key 47 on the console and display panel 42 is used to acknowledge and recall alarms from the air cart monitoring electronics including air flow. A variety of error messages that appear on the display screen 43 are available to inform the operator of any malfunctions.

To set fan speed, the operator would go through the following steps:
 set the console so that it displays the fan speed screen;
 select the top row of the display using the top select key; and
 set the desired RPM using the increase (+) or decrease (−) keys on the console unit.

Figure 12:
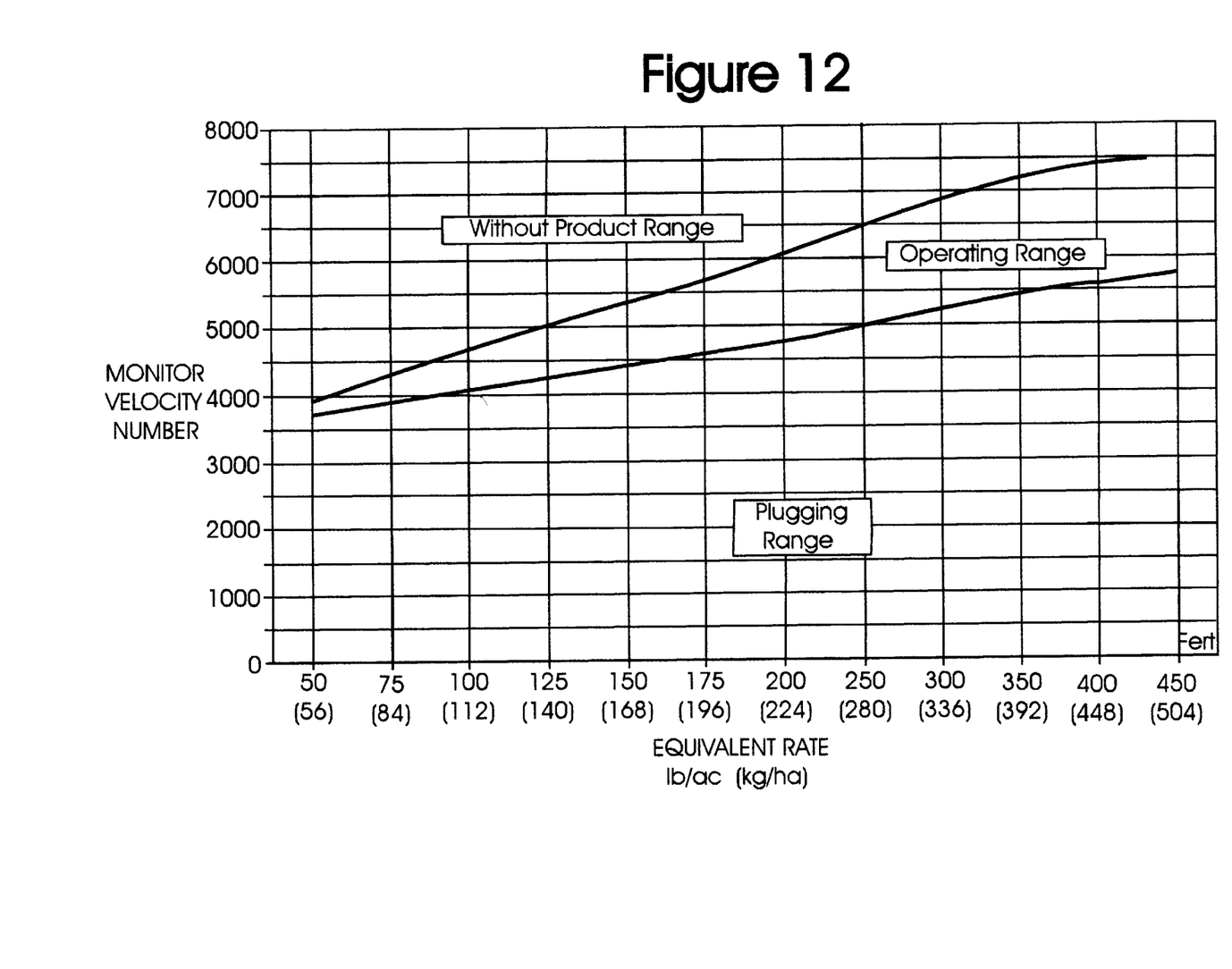
FIG. 12 is a velocity chart plotting monitor velocity numbers against an equivalent rate in pounds per acre.

Then to set air flow at each metering roll, the operator will go through the following steps:
 set the console so that it displays the air flow screen;
 select the tank for which the air flow must be set;
 set the desired air flow value by using the increase (+) or decrease (−) keys on the console unit to set the velocity number as determined by the method already known in the art, which is to determine the "total rate"; then calculate the equivalent rate, and then approximate the velocity number from a known velocity chart, such as shown in FIG. 12;
 wait five to thirty seconds to ensure that accurate air flow readings are made; and
 if the air flow reading is not the desired air flow value, the operator must repeat the steps above until the displayed value is the desired air flow value.

The above procedure must be repeated for each tank for which the air flow must be set.

One skilled in the art will realize that the air flow speed throughout the air distribution system is important in maintaining good farming practices. Planting without adequate amounts of air in each set of runs will result in blockage of seed and debris. An excess of air flow in the primary runs will result in scattered patterns of seed placement in furrows due to seed bounce. Excess air flow velocity can also impact and damage seed. Therefore, prior art utilizes air dampers to control the air flow settings throughout the air distribution system. These dampers are commonly set by adjustment levers for each bank of tubes. Rotating the handle either closes or opens the air dampers. With the present invention, the use of the adjustment lever is eliminated.

The operator first sets the desired value for fan speed (rpm). A specific fan speed value is recommended depending upon the number of runs used and the type of product being distributed.

The increase or decrease command is then transmitted from the console unit to the remote electronic circuitry by the communications bus. The remote unit receives the command and transfers the data to the driver electronics which controls the hydraulic flow control valve. The hydraulic circuit includes a hydraulic flow control valve and an electric linear actuator used in controlling the fan speed. The position of the fan speed linear actuator positions the hydraulic flow control valve and sets the fan speed rate.

The operator, then, sets a velocity number as determined by a simple calculation defined above by using the increase and decrease keys on the console unit. A separate velocity number is entered for each set of runs. Again, the increase or decrease command is transmitted from the console to the electronic circuitry by a communications bus. The driver electronics receive the command and transfers the data to the driver electronics which control the hydraulics circuit.

When an increase or decrease command for a particular air damper is entered by the operator in the console unit, each corresponding linear actuator is positioned. The actuator control arm is bolted to the linear actuator and is pivotally mounted to the air cart frame. It is also attached to the air damper. Movement of the linear actuator and control arm results in proportional movement of the air damper, thus positioning it to achieve the desired air flow rate.

Once the linear actuators have set the fan speed and positioned the air dampers, velocity sensors read the air flow rate, which are transmitted to the console on the communications bus and then the data is output on the display screen. This allows the operator to make adjustments to the fan and damper settings if the actual flow rate is not the desired rate. This process is repeated until the desired setting is reached for each tank.

The output data from the velocity sensors also informs the operator of any changes or fluctuations in the air speed during operation. In this way, the operator is always informed of the present air flow rates and can make any necessary changes on the go in order to keep the desired fan speed and air flow rates during operation.

The air control system is also designed to send error/alarm signals to the console unit. A variety of error messages are available to inform the operator of any malfunctions during operation.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. In an air seeder implement for planting agricultural crops, said air seeder having a frame; at least two storage tanks mounted on said frame to contain a supply of first and second products to be planted into the ground; a fan mounted on said frame and being operable to create a flow of air; a fan drive mechanism operably connected to said fan to power the rotation of said fan through a range of speeds; a bank of air flow tubes corresponding to each said storage tank and being operably associated with said fan to receive said flow of air therethrough; and air dampers mounted within each said bank of air flow tubes for rotation relative thereto, said air dampers being operable to restrict the flow of air through said bank of air flow tubes as a function of the rotated position of said air dampers between a fully open position in which the flow of air is unrestricted through said bank of air flow tubes and a closed position in which the flow of air is fully restricted from flowing through said bank of air flow tubes, a control system for controlling the flow of air through said bank of air flow tubes comprising:

a first actuator operably connected to said air dampers for a first bank of air flow tubes corresponding to a first storage tank to effect rotation thereof between said open and closed positions;

a second actuator operably connected to said air dampers for a second bank of air flow tubes corresponding to a second storage tank to effect rotation thereof between said open and closed positions;

a third actuator operably connected to said fan drive mechanism and being operable to vary the speed of operation of said fan and, thereby, effect a selective variance in the velocity of said air flow into said banks of air flow tubes; and a control mechanism operably connected to each said actuator for independent selective control thereof, whereby each said actuator can be selectively manipulated to control the velocity of air flowing through each said bank of air flow tubes.

2. The air seeder implement of claim 1 wherein said control mechanism comprises:

a microprocessor;

driver electronics controlled by said microprocessor for independent manipulation of each said actuator; and a control panel having input keys for inputting data into said microprocessor.

3. The air seeder implement of claim 2 wherein said control system further comprises velocity sensors corresponding to each said bank of air flow tubes to detect the velocity of air flowing through each respective said bank of air flow tubes, said control panel being operable to display a numerical representation corresponding to each sensed air flow velocity.

4. The air seeder implement of claim 3 wherein the velocity of the air flowing through each said bank of air flow tubes can be varied independently by manipulation of said control panel to effect corresponding manipulation of each said actuator.

5. The air seeder implement of claim 4 wherein said fan drive mechanism includes a hydraulic motor, each said actuator comprising an electric linear actuator, said air seeder implement further including a hydraulic system operably connected to said fan drive mechanism and each said electric linear actuator to power the operation thereof.

6. The air seeder implement of claim 5 wherein said air seeder implement has three storage tanks and a bank of air flow tubes with corresponding air damper and electric linear actuator for each said storage tank.

7. The air seeder implement of claim 6 wherein said microprocessor is operable to monitor velocity changes within each respective bank of air flow tubes and to display an error signal in the event a change in air velocity is greater than a predetermined threshold.

8. A method of controlling the flow of air through an air seeder implement for planting agricultural crops, said air seeder having a frame; a plurality of storage tanks mounted on said frame to contain corresponding supplies of products to be planted into the ground; a fan mounted on said frame and being operable to create a flow of air; a variable speed fan drive mechanism operably connected to said fan to power the rotation of said fan through a range of speeds; a bank of air flow tubes corresponding to each said storage tank and being operably associated with said fan to receive said flow of air therethrough; air dampers mounted within each said bank of air flow tubes for rotation relative thereto, said air dampers being operable to restrict the flow of air through said bank of air flow tubes as a function of the rotated position of said air dampers between a fully open position in which the flow of air is unrestricted through said bank of air flow tubes and a closed position in which the flow of air is fully restricted from flowing through said bank of air flow tubes; and a control system for controlling the flow of air through said bank of air flow tubes including a damper actuator operably connected to the air dampers for each respective bank of air flow tubes to effect rotation thereof between said open and closed positions, a fan drive actuator operably connected to said fan drive mechanism and being operable to selectively vary the speed of operation of said fan and, thereby, effect a selective variance in the velocity of said air flow into said banks of air flow tubes, comprising the steps of:

setting the fan rotational speed by manipulating said control system to move said fan drive actuator to a setting that effects a desired base velocity of air through all of said banks of air flow tubes; and subsequently adjusting the air flow at each bank of air flow tubes by manipulating said control system to move each respective said damper actuator independently whereby the velocity of air flowing through each respective bank of air flow tubes can be selected independently of each other bank of air flow tubes by varying the position of the corresponding said air damper.

9. The method of claim 8 further comprising the step of:

after said adjusting step, subsequently monitoring changes in the velocity established for each said bank of air flow tubes; and displaying an error signal in the event a change of any said velocity established for each said bank of air flow tubes varies more than a predetermined threshold.

10. The method of claim 8 wherein said control system includes a microprocessor, a control panel for inputting information into said microprocessor to manipulate and control the respective actuators and velocity sensors corresponding to each said bank of air flow tubes, said setting step includes the sub-steps of:

selecting control of the fan drive actuator by depressing a key on said control panel corresponding thereto; and establishing a desired fan speed by inputting a fan speed number into said microprocessor which effects a corresponding setting of said fan drive actuator to vary the speed of said fan accordingly.

11. The method of claim 10 wherein said sub-step of establishing a desired fan speed includes the step of:

looking up desired air flow velocity numbers as determined by velocity charts that reflect the product being planted into the ground; and using the increase or decrease keys on the control panel to vary a display on the control panel until the desired air flow velocity number is obtained.

12. The method of claim 10 wherein said adjusting step includes the sub-steps of:

selecting control of the damper actuators by depressing a key on said control panel corresponding thereto;

selecting a first storage tank for which the air flow must be set by depressing a key on said control panel corresponding thereto; and establishing a desired air flow velocity setting of a first damper actuator corresponding to said first storage tank to rotate the corresponding damper accordingly and create a resultant air flow velocity in a first bank of air flow tubes corresponding to said first storage tank.

13. The method of claim 12 wherein said adjusting step further includes the sub-steps of:

waiting a period of time while sensing said resulting air flow velocity with the corresponding velocity sensor to ensure that stabilized air flow velocity readings have been attained; and if the resulting air flow velocity is not equal to the desired air flow velocity, incrementally changing said velocity by appropriate inputs into said microprocessor until the resulting air flow velocity is substantially equal to the desired air flow velocity.

14. The method of claim 13 wherein said incrementally changing sub-step includes the steps of:

using the increase or decrease keys on the control panel to vary a display on the control panel; and repeating said waiting step and said using step until the resulting air flow velocity substantially equals the desired air flow velocity.

15. The method of claim 14 wherein the period of time for said waiting step is in the range of five to thirty seconds.

16. The method of claim 12 wherein said establishing step includes the steps of:

identifying the equivalent rate of application of the desired product to the ground; and consulting a velocity look-up chart to defame said velocity number before providing incremental change commands into said microprocessor.

17. The method of claim 12 wherein said adjusting step is repeated sequentially for each said storage tank for which the air flow must be set.

18. An air seeder implement for planting agricultural crops comprising:

a wheeled frame;

at least two storage tanks mounted on said frame to contain a supply of corresponding products to be planted into the ground;

a fan mounted on said frame and being rotatably operable to create a flow of air;

a hydraulic motor operably connected to said fan to power the rotation of said fan through a range of speeds;

a bank of air flow tubes corresponding to each said storage tank and being operably associated with said fan to receive said flow of air therefrom;

a set of air dampers mounted within each respective said bank of air flow tubes for rotation relative thereto, each said air damper being operable to restrict the flow of air through one of said air flow tubes as a function of the rotated position of said air damper between a fully open position in which the flow of air is unrestricted through the corresponding said air flow tube and a closed position in which the flow of air is fully restricted from flowing through said corresponding air flow tube; and a control system for controlling the flow of air through said bank of air flow tubes, including:

a damper actuator operably connected to each respective set of said air dampers to effect rotation thereof between said open and closed positions;

a fan drive actuator operably connected to said hydraulic motor and being operable to vary the speed of operation of said fan and, thereby, effect a selective variance in the velocity of said air flow into said banks of air flow tubes;

velocity sensors corresponding to each respective said bank of air flow tubes to detect the velocity of air flowing therethrough downstream of the corresponding said air dampers; and a control mechanism operably connected to each said actuator for independent selective control thereof, whereby each said actuator can be selectively manipulated to control the velocity of air flowing through each said bank of air flow tubes, said control mechanism including a microprocessor, driver electronics controlled by said microprocessor for independent manipulation of each said actuator; and a control panel having input keys for inputting data into said microprocessor.

19. The air seeder implement of claim 18 wherein said control panel has a display area for displaying inputted and sensed data, the keys on said control panel being operable to input data for the selection of fan speed and air flow control to effect a resulting air velocity measured by said velocity sensors.

* * * * *